Figure 1:
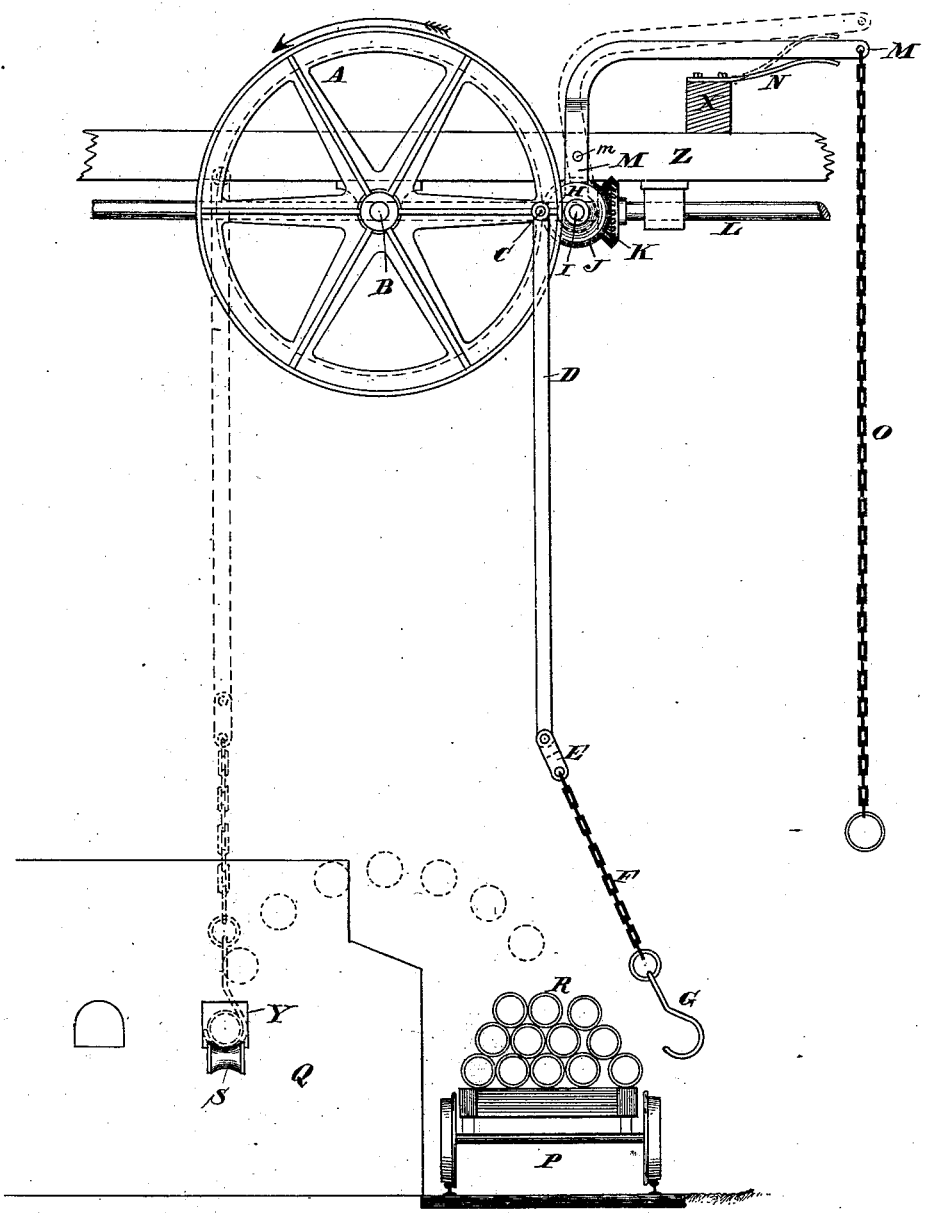

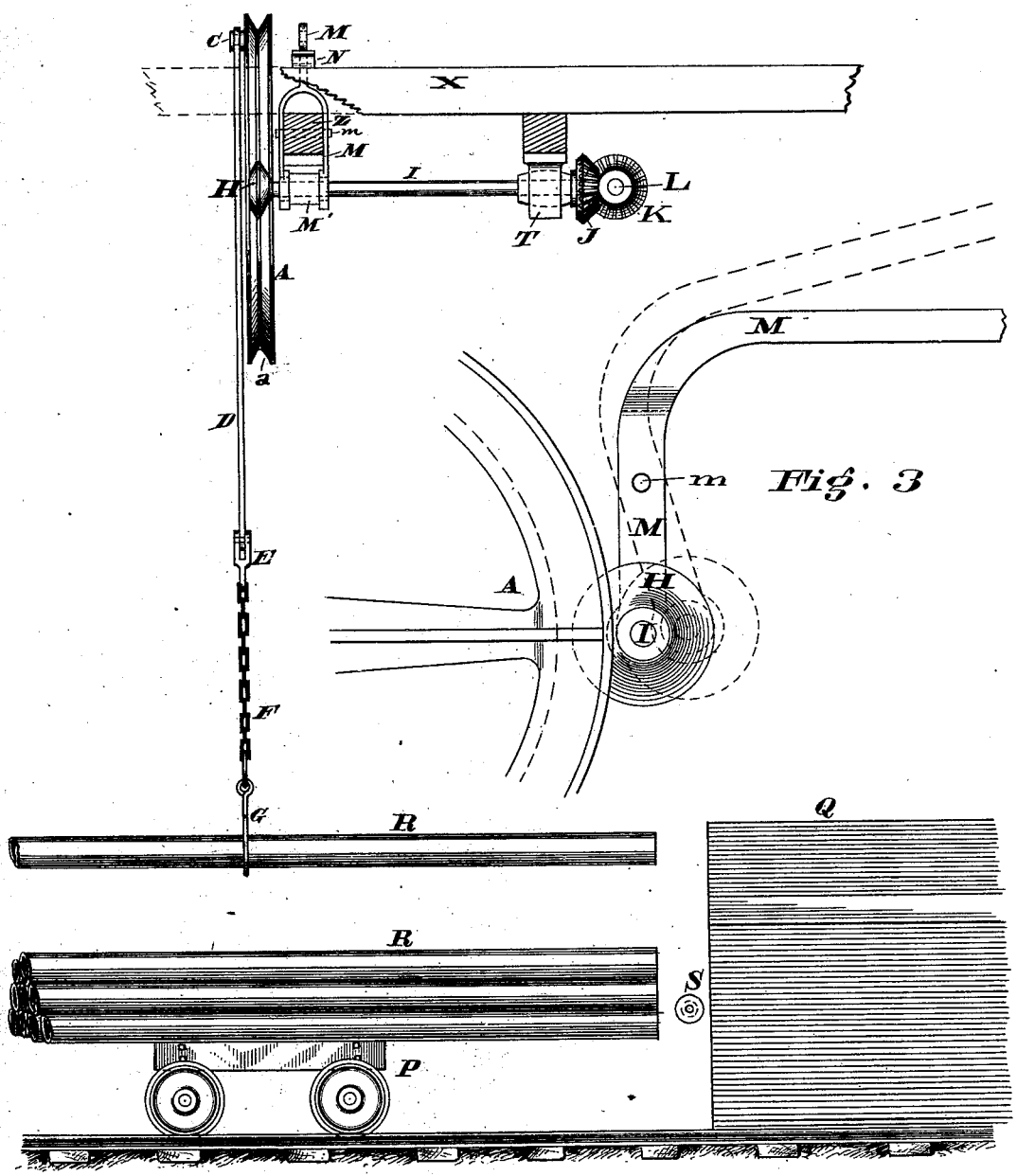

United States Patent Office.

WILLIAM C. ALLISON, OF PHILADELPHIA, PENNSYLVANIA.

MACHINE FOR HANDLING TUBES.

SPECIFICATION forming part of Letters Patent No. 235,397, dated December 14, 1880.

Application filed June 11, 1880. (No model.)

*To all whom it may concern:*

Be it known that I, WILLIAM CLARE ALLISON, of the city and county of Philadelphia, and State of Pennsylvania, have invented an Improvement in Machines for Handling Tubes, Skelps, &c., of which the following is a specification.

My invention relates to a class of machines designed to convey metal tubes or skelps from a truck and place them in a proper position to be fed into a welding or heating furnace; and my invention consists, mainly, in the adaptation of a wheel provided with mechanism wherewith to catch and lift a tube or skelp, whereby said wheel, in its revolution, will lift the tube or skelp from a truck or equivalent place of support situated at one side of the wheel and in its plane of revolution, and convey said tube or skelp to the other side of said wheel, and in the same plane, and place it directly in front of the feed-openings into the welding or heating furnace; and my invention further consists in the construction of said wheel, and mechanism whereby it is operated, all of which is fully set forth in the following specification, shown in the accompanying drawings, and referred to in the appended claims.

My invention has for its object the handling of the tubes or skelps, when being taken from the truck and placed in a position to be easily fed into a welding or heating furnace, by steam or mechanical power, and where manual labor has been heretofore used, thereby saving the labor of several men, and also in providing a more perfect and expeditious means to the end desired.

In the drawings, Figure 1 is a front elevation of an apparatus embodying in it my invention. Fig. 2 is a side elevation of same, and shows apparatus in the act of conveying a tube from the track to the furnace. Fig. 3 is an enlarged view of part of the feed-wheel and its friction drive-wheel.

A is the feed-wheel, and is of a diameter about equal to the distance between the center of the tube-truck P and the feed-opening Y in the welding or heating furnace Q. This wheel A has a V-shaped groove, *a*, on its circumferential line or periphery, and is supported and secured to a shaft, B, held in suitable bearings and free to revolve. Pivoted to wheel A at C, and near its periphery, is a bar, D, and hinged to the bar, at the bottom, is a link, E. Attached to the link E is a chain, F, carrying at its other end a swivel-hook, G. If desired, a single chain may be substituted for the bar, link, and chain, as above described.

Secured upon a shaft, I, working in a pivoted bearing, T, at one end, and a swinging bearing, M', at the other, is a friction drive-wheel, H, having its periphery shaped to fit the V-groove *a* in the feed-wheel A. Upon the other end of shaft I, and close to its pivoted bearing, is a bevel-wheel, J, and meshing with it is a similar wheel, K, secured upon the main driving-shaft L.

The swinging bearing M', carrying one end of shaft I, is attached to and forms part of a yoke, M, pivoted at *m* to the frame or timber Z, and provided with a lever-arm, to the end of which is attached a chain, O, having a hand-ring at the bottom and at a distance of about six feet from the ground.

Secured to the frame or timber X is a spring, N, which presses up the lever-arm of the yoke M, thereby oscillating the latter upon its pivot *m*, and throwing the friction drive-wheel H out of contact with the feed-wheel A, as shown in dotted lines, Fig. 3.

It is evident that there are many ways of imparting the necessary motion to the feed-wheel A; therefore I do not confine myself to the precise mechanism shown and described, as the main part of my invention is in the adaptation of the large feed-wheel.

The truck P runs upon a track which is usually placed close to the side of the furnace Q, and conveys the tubes R from another part of the mill to the position shown in Figs. 1 and 2, in which they are in a position requiring only lateral movement to place them before the opening Y in the welding or heating furnace Q.

S is a roller placed before the opening Y in the furnace, and acts as a support and guide to the tube while being pushed into the furnace.

Having now described the general construction of my invention, I will proceed to describe its method of operation.

The shaft I and friction-wheel H being rotated through the agency of the gears J and K and shaft L, a man places a stick of wood or a bar of iron into the end of a tube, R, on the truck P, and raises it up slightly on the end, and a boy places the hook G under it, and then pulls on the chain O, thereby compressing the spring N and throwing the yoke M forward, carrying the revolving driving friction-wheel H into contact with the feed-wheel A, rotating the same, and, owing to the great difference in the diameters of the two wheels, the feed-wheel A is revolved slowly in the direction of the arrow, Fig. 1, thereby raising the tube up from the truck, as shown in Fig. 2, and upon continuing its revolution carrying the said tube laterally through a space about equal to the diameter of the feed-wheel, and then lowers it in front of the opening Y of the furnace Q and upon the guide-roller S, as shown in dotted lines, Fig. 1, when it is immediately pushed into the furnace by hand or by a charging-machine. During this operation the tube is balanced upon the hook G and the end guided to the opening Y in the furnace by the man. If no more tubes are to be placed into the furnace, the boy will let go the chain O, when the spring N comes into play, and, through the agency of the yoke and its lever, throws the revolving driving friction-wheel H out of contact with the feed-wheel A, as shown in dotted lines, Fig. 3, and the said feed-wheel remains stationary and inert. If the tubes are to be placed in the furnace quickly, one after each other, the feed-wheel A is made to rotate as before described, and after every tube has been placed upon the roller S the hook G is free once more, and is quickly taken and placed under another tube, and before the pivot C reaches such an elevation in the plane of the feed-wheel A that it begins to raise said hook, and so on continuously.

An important feature in the invention lies in the fact that the tube is first raised up and free of those remaining on the truck and then carried laterally, and finally lowered slowly upon the guide-roller and in front of the opening in the furnace.

I am aware of the patent to E. Knight, No. 195,220, and do not claim anything therein shown and described. Knight's object is to provide means of lifting heavy work into and out of large lathes; and it consists of two face-wheels which carry a cross-bar, from which the work is suspended by swivels and chains, and the whole operates to raise the work from the ground and carry it between the lathe-centers, where it is adjusted by the swivels and screws. The bar and supporting-chains do not rotate about the lathe-centers, but only oscillate. His machine is only adapted to lathes, and could not operate to raise the tube or other piece of work, carry it laterally, and then automatically lower it before the lathe-centers, whereas I have a single wheel which rotates always in the same direction, and to the periphery of which I have firmly pivoted a bar, which is carried with said wheel, and rotates or moves in a vertical plane about fixed centers, and works in such a manner that it automatically raises the tube, carries it laterally the required distance, and then lowers it into the desired position without any adjustment. Every piece of work in the case of Knight's machine will require a special adjustment vertically of the swivels and screws to bring it in the lathe-centers, while with my improvement the machine is automatic and adjusts itself.

Having now described the construction and operation of my invention, what I claim as new, and desire to secure by Letters Patent, is—

1. In a machine for handling tubes, &c., a pivoted wheel which rotates always in the same direction, in combination with a bar securely pivoted to the periphery of the same, and provided at the lower end with a hook or its equivalent, every point of which bar, during the rotation of the wheel, describes a circle equal in radius to the distance from the center of the wheel to the pivot of the bar, the whole working automatically to raise the tube up from its support, carry it laterally, and then lower it before the opening in the furnace, substantially as described.

2. In a machine for handling tubes, &c., the combination of a feed-wheel, A, which rotates always in the same direction, bar D, provided with a hook, or its equivalent, on its lower end, and securely pivoted at its upper end to the periphery of said wheel, furnace Q, provided with the supporting-rollers S, or their equivalent, and driving mechanism to rotate the feed-wheel always in the same direction, the whole working to automatically raise the tube from its support, carry it laterally, and deposit it before the opening in the furnace, substantially as described.

3. In a machine for handling tubes or skelps, the feed-wheel A, having a V-shaped groove, a, and carrying the pivoted supporting bar and hook, or their equivalent, in combination with shaft I, with its pivoted and movable bearings, friction-wheel H, pivoted yoke M, provided with a lever and spring, N, substantially as and for the purpose specified.

4. In a machine for handling tubes, &c., the combination of feed-wheel A, which rotates always in the same direction, and bar D, provided with a hook, or its equivalent, on its end, and pivoted to the periphery of said rotating feed-wheel, with driving mechanism to rotate said feed-wheel always in the same direction, and mechanism to throw said feed-wheel out of action with said driving mechanism, substantially as described, and for the purpose specified.

In testimony of which invention I hereunto set my hand.

W. C. ALLISON.

Witnesses:
CHAS. B. MARTIN,
R. S. REED.